(12) United States Patent
Chatterji et al.

(10) Patent No.: US 6,978,834 B1
(45) Date of Patent: Dec. 27, 2005

(54) FOAMED AND NON-FOAMED CEMENT COMPOSITIONS INCLUDING SILANE TREATED AMORPHOUS SILICA AND METHODS

(75) Inventors: Jiten Chatterji, Duncan, OK (US); Roger S. Cromwell, Walters, OK (US); Craig W. Roddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 46 days.

(21) Appl. No.: 10/853,878

(22) Filed: May 26, 2004

(51) Int. Cl.$^7$ .................... E21B 33/14; C04B 24/42
(52) U.S. Cl. .................. 166/293; 106/677; 106/678; 106/806; 166/295; 166/309; 507/202; 507/234; 507/269
(58) Field of Search ................ 166/293, 292, 166/294, 295, 309; 106/490, 677, 678, 695, 106/708, 724, 725, 726, 727, 781, 806, 808, 106/809, 820, 823; 405/266, 267; 507/202, 507/234, 253, 269, 277

(56) References Cited

U.S. PATENT DOCUMENTS

| | | | | |
|---|---|---|---|---|
| 2,706,723 A | * | 4/1955 | Bass | 525/477 |
| 3,042,535 A | * | 7/1962 | Hiltrop et al. | 106/806 |
| 3,661,602 A | * | 5/1972 | Gerow | 106/603 |
| 4,074,536 A | | 2/1978 | Young | 63/36 C |
| 5,588,489 A | | 12/1996 | Chatterji et al. | 166/293 |
| 5,696,059 A | | 12/1997 | Onan et al. | 507/269 |
| 5,711,801 A | | 1/1998 | Chatterji et al. | 106/789 |
| 5,820,670 A | * | 10/1998 | Chatterji et al. | 106/737 |
| 5,875,845 A | | 3/1999 | Chatterji et al. | 166/293 |
| 5,875,846 A | | 3/1999 | Chatterji et al. | 166/293 |
| 5,908,660 A | * | 6/1999 | Griffith et al. | 427/220 |
| 6,006,836 A | | 12/1999 | Chatterji et al. | 166/295 |
| 6,063,738 A | | 5/2000 | Chatterji et al. | 507/269 |
| 6,098,711 A | | 8/2000 | Chatterji et al. | 166/294 |
| 6,210,476 B1 | | 4/2001 | Chatterji et al. | 106/677 |
| 6,234,251 B1 | | 5/2001 | Chatterji et al. | 166/295 |
| 6,321,841 B1 | | 11/2001 | Eoff et al. | 166/291 |
| 6,330,917 B2 | | 12/2001 | Chatterji et al. | 166/295 |
| 6,367,549 B1 | | 4/2002 | Chatterji et al. | 166/292 |
| 6,478,868 B1 | * | 11/2002 | Reddy et al. | 106/696 |
| 6,503,870 B2 | | 1/2003 | Griffith et al. | 507/219 |
| 6,516,883 B1 | | 2/2003 | Chatterji et al. | 166/293 |
| 6,593,402 B2 | | 7/2003 | Chatterji et al. | 524/7 |
| 6,613,139 B1 | | 9/2003 | Revis | 106/490 |

OTHER PUBLICATIONS

Halliburton brochure entitled "Howco-Suds Surfactant" dated 1999.

Communication from a related counterpart application dated May 25, 2005.

* cited by examiner

*Primary Examiner*—George Suchfield
(74) *Attorney, Agent, or Firm*—Craig W. Roddy; McAfee & Taft P.C.

(57) ABSTRACT

The present invention provides improved methods of cementing and cement compositions. A cement composition of the invention comprises hydraulic cement, silica hydrophobicized with a mixture of organosilicon compounds and water which upon hardening has high shear bond strength.

37 Claims, No Drawings

US 6,978,834 B1

FOAMED AND NON-FOAMED CEMENT COMPOSITIONS INCLUDING SILANE TREATED AMORPHOUS SILICA AND METHODS

BACKGROUND OF THE INVENTION

1. Field of the Invention

The present invention relates to cementing generally, and more particularly, to cement compositions which set into resilient high strength masses.

2. Description of the Prior Art

Hydraulic cement compositions are commonly utilized in forming structures above and below ground. In forming such structures, a hydraulic cement composition is pumped into a form or other location to be cemented and allowed to set therein. Generally, the set cement compositions must have high shear bond strength to avoid bond failure.

In the construction and repair of wells such as oil and gas wells, hydraulic cement compositions are pumped into locations therein to be cemented and allowed to set. In primary well cementing, a hydraulic cement composition is pumped into the annular space between the walls of the well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented.

The cement sheath in the annulus between a pipe string and the walls of a well bore often fails due to pipe movements which cause shear stresses to be exerted on the set cement. Such stress conditions are commonly the result of relatively high fluid pressures and/or temperatures inside the cemented pipe string during testing, perforating, fluid injection or fluid production. The high internal pipe pressure and/or temperature can result in the expansion of the pipe string, both radially and longitudinally, which places stresses on the cement sheath causing the cement bond between the exterior surfaces of the pipe or the well bore walls, or both, to fail which allows leakage of formation fluids, etc.

Thus, there are needs for improved cement compositions and methods whereby after setting, the cement compositions form solid masses which have high bond strengths sufficient to withstand stresses without failure.

SUMMARY OF THE INVENTION

The present invention provides cement compositions and methods which meet the needs described above and overcome the deficiencies of the prior art. A cement composition of this invention comprises a hydraulic cement, silica hydrophobicized with a mixture of organosilicon compounds and water.

Another cement composition of this invention comprises a hydraulic cement, silica hydrophobicized with a mixture of organosilicon compounds present in an amount in the range of from about 10% to about 20% by weight of the hydraulic cement and sufficient water to form a slurry.

A method of cementing of this invention comprises the steps of placing a cement composition comprising hydraulic cement, silica hydrophobicized with a mixture of organosilicon compounds and sufficient water to form a slurry in a location to be cemented, and allowing the cement composition to harden therein.

Another method of cementing of this invention comprises the steps of placing a cement composition between a pipe string and the walls of a well bore which hardens into a high shear bond strength mass comprising a hydraulic cement, silica hydrophobicized with a mixture of organosilicon compounds present in an amount in the range of from about 10% to about 20% by weight of the hydraulic cement and sufficient water to form a slurry, and allowing the cement composition to harden therein.

The objects, features and advantages of the present invention will be readily apparent to those skilled in the art upon a reading of the description of preferred embodiments which follows.

DESCRIPTION OF PREFERRED EMBODIMENTS

The present invention provides improved cement compositions and methods of cementing whereby the hardened cement compositions are solid masses having high bond strengths.

A cement composition of this invention comprises a hydraulic cement, silica hydrophobicized with a mixture of organosilicon compounds and water.

Another cement composition of this invention comprises a hydraulic cement, silica hydrophobicized with a mixture of organosilicon compounds present in an amount in the range of from about 10% to about 20% by weight of hydraulic cement and sufficient water to form a slurry.

A variety of hydraulic cements can be utilized in accordance with the present invention including those comprising calcium, aluminum, silicon, oxygen and/or sulfur which set and harden by reaction with water. Such hydraulic cements include Portland cements, pozzolana cements, gypsum cements, high aluminum content cements, silica cements and high alkalinity cements. Portland cements are generally preferred for use in accordance with the present invention. Portland cements of the types defined and described in *API Specification For Materials And Testing For Well Cements*, API Specification 10B, 22$^{nd}$ Edition, dated Dec. 1, 1997 of the American Petroleum Institute are particularly suitable. Preferred API Portland cements include classes A, B, C, G and H, with API classes G and H being more preferred and class G being the most preferred.

The water utilized in the cement compositions of this invention can be fresh water or salt water including brines and seawater.

It has been discovered that the addition of precipitated amorphous silica hydrophobicized with a mixture of organosilicon compounds to the cement compositions of this invention significantly improves the shear bond strengths of the hardened cement compositions. The silica hydrophobicized with a mixture of organosilicon compounds that is useful in accordance with the present invention is described in detail in U.S. Pat. No. 6,613,139 issued to Revis on Sep. 2, 2003, which is incorporated herein by reference thereto. More specifically, amorphous silica is contacted with a mixture of organosilicon compounds. One such mixture that can be utilized is a mixture of diorganodihalosilane and monoorganotrihalosilane present in a weight ratio of 1:0.1 to 1:2, respectively. The mixture can further comprise mercaptopropyltriethoxysilane. Other mixtures that can be utilized include a mixture of dialkyldichlorosilane and a monoalkyltrichlorosilane including, but not limited to, a mixture of dimethyldichlorosilane and methyltrichlorosilane and a mixture of dimethyldichlorosilane and n-propyltrichlorosilane, phenyltricholorosilane or cyanopropyltrichlorosilane. Another mixture of organosilicon compounds that can be utilized is a mixture of a diorganodihalosilane, a monoorganotrihalosilane and an alkoxysilane such as mercaptopropyltriethoxysilane.

The cement compositions of this invention can also be foamed cement compositions. That is, the compositions can include a foaming surfactant and a gas whereby upon being mixed, a foamed cement composition is formed. Examples of foaming surfactants that can be used include, but are not limited to, a mixture of the ammonium salt of alcohol ether sulfate (HOWCO SUDS™) and cocoylamidopropyl betaine (HC-2™) commercially available from Halliburton Energy Services, Inc.; a 2:1 mixture of the sodium salt of alpha-olefin sulfonate (AQF-2™) and cocylamidopropyl betaine (HC-2™) commercially available from Halliburton Energy Services, Inc.; and a mixture of an ethoxylated alcohol ether sulfate, an alkyl or alkyene amidopropyl betaine and an alkyl or alkene amidopropyldimethylamine oxide commercially available from Halliburton Energy Services, Inc. under the trade name ZONESEALANT 200™. Of these, ZONESEALANT 2000™ additive is preferred.

The gas is generally air or nitrogen with nitrogen being preferred. The foaming surfactant is present in the cement composition in an amount in the range of from about 1% to about 5% by weight of water. The gas is present in an amount sufficient to form a foam, generally in an amount in the range of from about 20% to about 80% by weight of water in the cement composition.

A cement composition of this invention comprises: a hydraulic cement; silica hydrophobicized with a mixture of organosilane compounds; and water.

Another resilient, high shear bond strength cement composition of the present invention comprises: a hydraulic cement, silica hydrophobicized with organosilane compounds present in an amount in the range of from about 10% to about 20% by weight of the hydraulic cement and sufficient water to form a slurry.

A method of cementing of this invention comprises: placing a cement composition comprising hydraulic cement, silica hydrophobicized with a mixture of organosilicon compounds and sufficient water to form a slurry in a location to be cemented; and allowing the cement composition to harden therein.

Another method of cementing of this invention comprises: placing a cement composition between a pipe string and the walls of a well bore which hardens into a high shear bond strength mass comprising a hydraulic cement, silica hydrophobicized with a mixture of organosilicon compounds present in an amount in the range of from about 10% to about 20% by weight of the hydraulic cement and sufficient water to form a slurry; and allowing the cement composition to harden therein.

In order to further illustrate the compositions and methods of the present invention, the following examples are given.

EXAMPLE

A reaction flask was charged with 2000 grams of amorphous silica slurry and 165 grams of concentrated sulfuric acid. The slurry was heated to a temperature of 70° C. and a mixture containing 9.1 grams of methyltrichlorosilane and 16.38 grams of dimethyldichlorosilane was added to the reaction flask over a period of about 2 to 7 minutes. The treated slurry was then stirred and cooled to room temperature over a 60 minute period. 600 milliliters of a solution containing 25% by weight of sodium hydroxide was added to the stirred slurry in order to adjust the pH to a range of from 3.4 to 3.7. The slurry was then transferred to a Buchner funnel and vacuum filtered to remove the aqueous phase. The filter cake was then washed with water until the filtrate read less than 100 micro ohms. After allowing it to air dry, the treated silica was reslurried in deionized water to provide a slurry containing 20% to 40% by weight of the treated silica. The slurry was mixed until the solids were broken up and then pumped to a spray drier at a rate of about 20 milliliters per minute with an inlet temperature of 260° C. and an outlet temperature between 120° C. to 140° C. The dried silica was collected.

An elemental analysis of the resulting hydrophoicized silica showed that it had a carbon content of 5.13%; a hydrogen content of 0.96%; a nitrogen content of 0.05%; and a surfactant of 0.53%. An elemental analysis of the untreated amorphous silica showed that it had a carbon content of 1.33%; a hydrogen content of 0.23%; a nitrogen content of 0.02%; and a sulfur content of 0.53%.

Non-foamed and foamed cement slurries containing 10, 15 and 20% of hydrophobicized and untreated silica were prepared. After setting, the shear bond strengths of the various cements were determined. The results of these tests are shown in the Table below.

TABLE

Slurry: Class G Cement + Amorphous Silica + Water

| Amorphous Silica % | Treat Amphorous Silica[1] % | Slurry Weight #/gal | Foamed Weight #/gal | Water Gal/sk | Shear Bond[2] Psi |
|---|---|---|---|---|---|
| 10 |  | 15.00 |  | 6.53 | 223.5 |
|  | 10 | 15.00 |  | 6.53 | 252.5 |
| 10 |  | 15.00 | 13.00 | 6.53 | 234.0 |
|  | 10 | 15.00 | 13.00 | 6.53 | 292.0 |
| 15 |  | 15.00 |  | 6.73 | 164.0 |
|  | 15 | 15.00 |  | 6.73 | 208.0 |
| 15 |  | 15.00 | 13.00 | 6.73 | 214.0 |
|  | 15 | 15.00 | 13.00 | 6.73 | 287.0 |
| 20 |  | 15.00 |  | 6.93 | 213.0 |
|  | 20 | 15.00 |  | 6.93 | 257.0 |
| 20 |  | 15.00 | 13.00 | 6.93 | 273.0 |
|  | 20 | 15.00 | 13.00 | 6.93 | 410.0 |

[1]Treated with 9.1 grams of Methyltrichloro Silane and 16.38 grams of Dimethyldichloro Silane
[2]The slurries were cured at 140° F. for 72 hours for shear bond measurements following API procedure.

From the Table, it can be seen that the cement compositions containing treated amorphous silica had significantly higher shear bonds than the cement compositions containing non-treated amorphous silica.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A method of cementing comprising:
    placing a cement composition comprising hydraulic cement, silica hydrophobicized with a mixture of organosilicon compounds comprising a mixture of diorganodihalosilane and monoorganotrihalosilane and sufficient water to form a slurry in a location to be cemented; and allowing the cement composition to harden therein.

2. The method of claim 1 wherein the hydraulic cement is Portland cement, pozzolana cement, gypsum cement, aluminum cement, silica cement or high alkalinity cement.

3. The method of claim 1 wherein the silica hydrophobicized with a mixture of organosilicon compounds is present in an amount in the range of from about 10% to about 20% by weight of hydraulic cement in the composition.

4. The method of claim 1 wherein the water is fresh water or salt water including brines and seawater.

5. The method of claim 1 wherein the organosilicon compounds are present in the mixture thereof in a weight ratio of 1:0.1 to 1:2, respectively.

6. The method of claim 1 wherein the mixture further comprises mercaptopropyltriethyoxysilane.

7. The method of claim 1 wherein the mixture of organosilicon compounds comprises a mixture of a dialkyldichlorosilane and a monoalkyltrichlorosilane.

8. The method of claim 1 wherein the mixture of organosilicon compounds comprises a mixture of dimethyldichlorosilane and methyltrichlorosilane.

9. The method of claim 1 wherein the mixture of organosilicon compounds comprises a mixture of dimethyldichlorosilane and n-propyltrichlorosilane, phenyltrichlorosilane or cyanopropyltrichlorosilane.

10. The method of claim 1 wherein the mixture of organosilicon compounds comprises a mixture of a diorganodihalosilane and a monoorganotrihalosilane in a weight ratio of 1:0.1 to 1:2, respectively.

11. The method of claim 10 wherein the mixture of organosilicon compounds further comprises an alkoxysilane.

12. The method of claim 11 wherein the alkoxysilane is mercaptopropyltriethoxysilane.

13. The method of claim 1 which further comprises a foaming surfactant and a gas in the cement composition whereby the cement composition is foamed.

14. The method of claim 13 wherein the foaming surfactant is a mixture of an ethoxylated alcohol ether sulfate surfactant, an alkyl or alkene amidopropyl betaine surfactant and an alkyl or alkene amidopropyl dimethyl amine oxide surfactant.

15. The method of claim 13 wherein the foaming surfactant is present in the cement composition in an amount in the range of from about 1% to about 5% by weight of water therein.

16. The method of claim 13 wherein the gas is air or nitrogen.

17. The method of claim 16 wherein the gas is present in the cement composition in an amount sufficient to foam the composition.

18. The method of claim 1 wherein the location to be cemented is above ground.

19. The method of claim 1 wherein the location to be cemented is below ground.

20. The method of claim 1 wherein the location to be cemented is between a well and a pipe disposed therein.

21. A method of cementing comprising:
placing a cement composition between a pipe string and the walls of a well bore which hardens into a high shear bond strength mass comprising a hydraulic cement, silica hydrophobicized with a mixture of organosilicon compounds comprising a mixture of diorganodihalosilane and monoorganotrihalosilane present in an amount in the range of from about 10% to about 20% by weight of the hydraulic cement and sufficient water to form a slurry; and allowing the cement composition to harden therein.

22. The method of claim 21 wherein the hydraulic cement is Portland cement, pozzolana cement, gypsum cement, aluminum cement, silica cement or high alkalinity cement.

23. The method of claim 21 wherein the hydraulic is Portland cement.

24. The method of claim 21 wherein the water is fresh water or salt water including brines and seawater.

25. The method of claim 21 wherein the organosilicon compounds are present in the mixture thereof in a weight ratio of 1:0.1 to 1:2, respectively.

26. The method of claim 21 wherein the mixture further comprises mercaptopropyltriethyoxysilane.

27. The method of claim 21 wherein the mixture of organosilicon compounds comprises a mixture of a dialkyldichlorosilane and a monoalkyltrichlorosilane.

28. The method of claim 21 wherein the mixture of organosilicon compounds comprises a mixture of dimethyldichlorosilane and methyltrichlorosilane.

29. The method of claim 21 wherein the mixture of organosilicon compounds comprises a mixture of dimethyldichlorosilane and n-propyltrichlorosilane, phenyltrichlorosilane or cyanopropyltrichlorosilane.

30. The method of claim 21 wherein the mixture of organosilicon compounds comprises a mixture of a diorganodihalosilane and a monoorganotrihalosilane in a weight ratio of 1:0.1 to 1:2, respectively.

31. The method of claim 30 wherein the mixture of organosilicon compounds further comprises an alkoxysilane.

32. The method of claim 31 wherein the alkoxysilane is mercaptopropyltriethoxysilane.

33. The method of claim 21 which further comprises a foaming surfactant and a gas in the cement composition whereby the cement composition is foamed.

34. The method of claim 33 wherein the foaming surfactant is a mixture of an ethoxylated alcohol ether sulfate surfactant, an alkyl or alkene amidopropyl betaine surfactant and an alkyl or alkene amidopropyl dimethyl amine oxide surfactant.

35. The method of claim 33 wherein the foaming surfactant is present in the cement composition in an amount in the range of from about 1% to about 5% by weight of water therein.

36. The method of claim 33 wherein the gas is air or nitrogen.

37. The method of claim 33 wherein the gas is present in the cement composition in an amount sufficient to foam the composition.

* * * * *